United States Patent
Gaspar Martinho et al.

(10) Patent No.: US 7,737,189 B2
(45) Date of Patent: Jun. 15, 2010

(54) PROCESS FOR THE PREPARATION, UNDER SUBCRITICAL CONDITIONS, OF MONOLITHIC XEROGELS AND AEROGELS OF SILICA/LATEX HYBRIDS, MODIFIED WITH ALKOXYSILANE GROUPS

(75) Inventors: José Manuel Gaspar Martinho, Lisbon (PT); Laura Maria Ilharco De Almeida Santos, Lisbon (PT); José Paulo Sequira Farinha, Lisbon (PT); Alexandra Marina Abrantes Fidalgo, Lisbon (PT); Pedro Oliveira Martinho, Lisbon (PT)

(73) Assignee: Instituto Superior Tecnico, Lisbon (PT)

(*) Notice: Subject to any disclaimer, the term of this patent is extended or adjusted under 35 U.S.C. 154(b) by 0 days.

(21) Appl. No.: 11/910,716

(22) PCT Filed: Apr. 4, 2006

(86) PCT No.: PCT/PT2006/000010

§ 371 (c)(1),
(2), (4) Date: Feb. 11, 2008

(87) PCT Pub. No.: WO2006/107226

PCT Pub. Date: Oct. 12, 2006

(65) Prior Publication Data

US 2008/0188575 A1   Aug. 7, 2008

(30) Foreign Application Priority Data

Apr. 5, 2005   (PT) ........................... 103257

(51) Int. Cl.
C01B 33/152   (2006.01)
B01J 13/00   (2006.01)
(52) U.S. Cl. .................... 516/111; 521/64; 516/99
(58) Field of Classification Search ............ 516/111
See application file for complete search history.

(56) References Cited

U.S. PATENT DOCUMENTS

| | | | |
|---|---|---|---|
| 2,893,962 A | 7/1959 | Bartell |
| 3,243,769 A | 3/1966 | Trott |
| 3,672,833 A | 6/1972 | Teichner et al. |
| 4,610,863 A | 9/1986 | Tewari et al. |
| 4,667,417 A | 5/1987 | Graser et al. |
| 4,681,615 A | 7/1987 | Toki et al. |
| 4,954,327 A | 9/1990 | Blount |
| 5,023,208 A | 6/1991 | Pope et al. |
| 5,124,364 A | 6/1992 | Wolff et al. |
| 5,243,769 A | 9/1993 | Wang et al. |
| 5,264,197 A | 11/1993 | Wang et al. |
| 5,746,992 A | 5/1998 | Yoldas et al. |
| 5,795,557 A | 8/1998 | Pajonk et al. |
| 5,911,658 A | 6/1999 | Yoldas |
| 5,966,832 A | 10/1999 | Kirkbir et al. |
| 6,040,375 A | 3/2000 | Behme et al. |
| 6,087,407 A | 7/2000 | Coronado et al. |
| 6,143,400 A | 11/2000 | Schwertfeger et al. |
| 6,159,539 A | 12/2000 | Schwertfeger et al. |
| 6,479,416 B1 | 11/2002 | Frank et al. |
| 6,670,402 B1 | 12/2003 | Lee et al. |
| 2005/0192366 A1* | 9/2005 | Ou et al. ............. 521/64 |

FOREIGN PATENT DOCUMENTS

| | | |
|---|---|---|
| EP | 0018955 A1 | 11/1980 |
| EP | 0171722 A2 | 2/1986 |
| EP | 0366197 A1 | 5/1990 |
| GB | 655612 A | 7/1951 |
| WO | 9203378 A1 | 3/1992 |
| WO | 9220623 A1 | 11/1992 |
| WO | 9425149 A1 | 11/1994 |

OTHER PUBLICATIONS

Pomogailo et al. "polymer Sol-Gel Synthesis of Hybrid Nanocomposites", Colloid Journal, vol. 67, No. 6, 2005, pp. 658-677.*
Chujo, "Organic-inorganic hybrid materials", Current Opinion in Solid State & Materials Science, 1996, 1:806-811.*
Costa et al., Structural Control in Poly(butyl acrylate)-Silica Hybrids by Modifying Polymer-Silica Interactions, Journal of Sol-Gel Science and Technology 27, 343-354, 2003.*
Schmidt, H. Chemistry Of Material Preparation By The Sol-Gel Process. Journal of Non-Crystalline Solids. 1988. vol. 100. pp. 51-64.
Fidalgo, A. et al. Hybrid Silica Gel-Polytetrahydrofuran Thin Films. Journal of Sol-Gel Science and Technology. 1988. vol. 13. pp. 433-437.

* cited by examiner

Primary Examiner—Ling-Siu Choi
Assistant Examiner—Chun-Cheng Wang
(74) Attorney, Agent, or Firm—Hirsch Simpson LLC

(57) ABSTRACT

The invention relates to a process for the preparation of monolithic xerogels and aerogels of silica/latex hybrids under subcritical conditions. In the two-stage synthesis of these alcogels in the presence of an acid-base catalyst, the hydrolysis and polycondensation of a silicon alkoxide are carried out in an organic medium containing excess water. A latex consisting of polybutyl methacrylate and polybutyl acrylate, modified with alkoxysilane groups, is first synthesized and then incorporated in the mixture either in the first stage in order to effect its co-hydrolysis with the silicon alkoxide, or in the second stage to effect its co-condensation with the previously hydrolysed colloidal silica. The resulting alcogels are aged, washed, and dried under subcritical conditions. This process gives hybrid products containing 0.1-50 wt-% of latex and having a density of 300-1300 kg/m3, a porosity of 40-85%, a specific surface area of 400-900 m2/g and a mean pore diameter of 2-12 nm. The products are resistant to atmospheric humidity and moisture, have better mechanical properties than the corresponding inorganic products, and can be used as thermal, acoustic and electrical insulators.

31 Claims, 1 Drawing Sheet

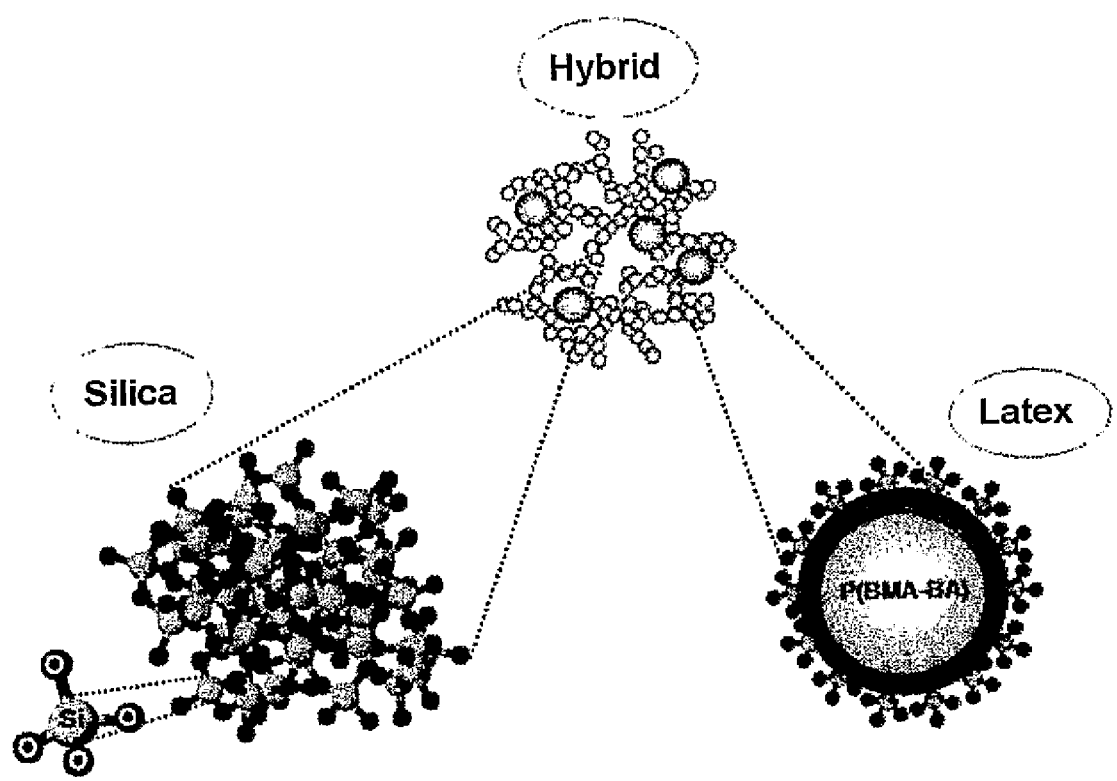

US 7,737,189 B2

PROCESS FOR THE PREPARATION, UNDER SUBCRITICAL CONDITIONS, OF MONOLITHIC XEROGELS AND AEROGELS OF SILICA/LATEX HYBRIDS, MODIFIED WITH ALKOXYSILANE GROUPS

FIELD OF THE INVENTION

The present invention relates in general to hybrid xerogels and aerogels with nano-size pores and especially to a hybrid material that has nano-size pores and contains 0.1-50 wt-% of a colloidal polymer (latex) chemically bound to an inorganic silica matrix, as well as relating to a process for the preparation and use of this material.

PRIOR ART

Modern industry needs more and more energy, but also has to satisfy ever increasing environmental requirements, which calls for greater efforts to develop more efficient insulating materials.

The conventional insulators, such as mineral wool and expanded polymers do not meet these requirements. The production of mineral wool needs high temperatures, and involves the formation of undesirable residues. On the other hand, polymer foams made from polystyrene, polyolefins and polyurethanes need blowing agents that are chemically fluorocarbons (CFs), chlorofluorocarbons (CFCs) or hydrocarbons, such as pentane isomers. The blowing agents fill the voids of the cells in the foam and ensure suitable thermal properties, namely a heat conductance of 0.02-0.04 W/m.K. However, these insulators are harmful to the environment, because the blowing agent slowly escapes from them into the atmosphere. Non-halogenated blowing agents have a less polluting effect, but cause problems in the preparation and use of plastic foams, since they are flammable. Furthermore, the plastic foams are not biodegradable and have a short service life, rendering them unsuitable for many applications.

However, inorganic insulators of a new type that are very efficient, stable, non-flammable and environment-friendly are being slowly introduced on the market. These consist of xerogels and aerogels, and are currently prepared for use as optical, thermal, acoustic and electrical insulators. Silica aerogels have been proposed in particular as future insulating materials for various applications, as described e.g. in European Patent EP-A 0,171,722. These materials are low-density inorganic foams with a density of 3-600 kg/m$^3$ and a continuous network of pores inside a solid matrix formed by colloidal particles or interconnected polymer chains with typical diameters of the order of 10 nm. This microstructure ensures a porosity of 60-99 vol-% and a large specific surface area of 350-1100 m$^2$/g, which make these materials excellent thermal and acoustic insulators, with a heat conductance of the order of 0.01-0.02 W/m·K and an acoustic impedance of the order of 10$^3$-10$^6$ kg/m$^2$·s. Furthermore, their low density ensures an exceptionally low dielectric constant (of the order of 1-2), which makes them suitable for electronic applications. However, these materials have a low compression strength and are fragile.

The preparation of silica aerogels basically involves two steps, namely the synthesis of a wet silica gel and the drying of said wet silica gel without an appreciable decrease in its volume. Strictly speaking, an aerogel is a gel that has been dried at a temperature and pressure that are above the critical point of the liquid that is to be removed from it. If, on the other hand, the liquid contained in the gel is removed in the subcritical range, the resulting material is called a xerogel. Broadly speaking, an aerogel is "a dry gel containing more than 50 vol-% of air as the disperse phase", and in this sense aerogels can include xerogels. The dry gels according to the present invention are classified either as aerogels or as xerogels, depending on whether they contain more than 50% of air as the disperse phase or less than that, respectively.

Wet silica gels were originally prepared by the aqueous condensation of sodium silicate in an acid medium [see for example S. S. Kistler, *J. Phys Chem.*, 36 (1932), pp. 52-64, which is given here as a reference]. This is an efficient method, but the salts formed as by-products inside the gel have to be removed by several washing cycles, which is a long and laborious operation. With the development of sol-gel chemistry, however, the formation of undesirable by-products is avoided, as described U.S. Pat. No. 3,672,833, and a much better control over the end product is made possible. In the sol-gel process, a colloidal solution (i.e. a sol) is used that contains water, solvents, catalysts and the precursors of vitreous or ceramic materials. This colloidal solution is placed in a mould in which the inorganic polymerization reaction is carried out to obtain a gel. In the case of silica, the solution typically contains a silicon alkoxide, water, an alcohol and an acid or alkaline catalyst. As a result of hydrolysis and polycondensation, the sol forms a porous solid matrix that remains in the residual liquid reaction mixture. The wet gel is a monolithic body having basically the same shape and size as the mould used.

The advantages of the sol-gel process are that the product formed is chemically very pure and highly homogeneous, the composition can be chosen from a wide range, relatively low temperatures are needed, and monolithic pieces with more or less the required shape can be obtained, saving on the finishing cost. However, it has been generally found extremely difficult to use the sol-gel process for making large monolithic pieces that have a high porosity and no cracks. Cracks are generally formed during drying and result from the capillary pressure that the liquid filling the pores exerts on the walls of the pores, due to its surface tension. Since the extremely porous structure of the wet gel has a low mechanical strength, the resulting capillary pressure can be strong enough to make the network collapse and the product crack. Furthermore, the capillary forces can greatly reduce the volume of the gel, leading to a partial loss of its intrinsic porosity. The capillary pressure depends on the surface tension of the liquid in the pores, on the angle of contact between the liquid and the pore walls, and on the mean radius of the pores. Several attempts have been made to eliminate these problems encountered in the preparation of monolithic pieces of sol-gel, but they have so far only succeeded by sacrificing one or more of the advantages.

There are generally two ways of drying monolithic sol-gel pieces. In the first method, called subcritical drying, the wet gel is dried at atmospheric pressure and at a temperature that is close to or slightly above the boiling point of the liquid used as the drying medium (see for example U.S. Pat. No. 5,966, 832). In the second method, called supercritical drying, the wet gel is heated to a temperature above the critical temperature of the liquid used as the drying agent. This is done in an autoclave, which makes it possible to exceed the critical pressure of the liquid. This process has been described for example in European Patents EP-A No. 0,018,955 and EP-A No. 0,366,197 and in International Patent WO 92/03378.

The supercritical method is very efficient in preventing the formation of cracks during drying, because there is no liquid/vapour interface in the pores of the gel matrix above the critical point, and so there are no capillary forces in operation. The gel thus obtained only loses a small part of its volume on drying (less than 15%) with respect to the volume of the wet gel. However, though efficient, this method is dangerous and expensive, partly because generally high temperatures and pressures are used in it, and partly because the equipment needed is relatively costly and the intermediate steps are slow and complicated. For example, if ethanol is used as the drying liquid, the temperature exceeds 243° C. and the pressure exceeds 6.4 Mpa. Such a high pressure calls for special equipment (an autoclave), which may be prohibitively expensive. The monolithic pieces of silica aerogel obtained here are therefore generally small, owing to the high cost of large autoclaves. Besides, according to the literature, the monolithic aerogel pieces made by this method are very fragile.

To minimize these shortcomings, the supercritical drying method has been further developed, namely by replacing the alcohol by an inorganic solvent such as liquid carbon dioxide, which has a critical temperature of 31.06° C. and a critical pressure of 7.3 MPa before supercritical ventilation. This makes the drying operation cheaper and safer, as described for example in U.S. Pat. No. 4,610,863 and U.S. Pat. No. 5,795,557. However, although the cost of the autoclave is greatly reduced when working under milder conditions, the compressor needed to liquefy carbon dioxide and the cryogenic equipment needed to keep it in the liquid state are still very expensive. The cost can be further reduced if supercritical carbon dioxide is directly substituted for the alcohol, as described for example in U.S. Pat. No. 6,670,402 B1. However, this method is also very sluggish, owing to the solvent substitution process involved, which is limited by diffusion. Besides, the aerogels thus obtained are extremely hydrophilic and call for further chemical treatment after drying in order to make them stable to atmospheric humidity and moisture.

The subcritical method used for the preparation of silica aerogels does involve some problems due to the formation of liquid/vapour interfaces, mentioned above. Thus, as soon as the liquid begins to evaporate from the gel at a temperature below the critical value, the surface tension of the liquid forms a concave meniscus inside the pores of the gel. As the evaporation proceeds, the meniscus recedes further into the gel, which shrinks under the influence of compressive forces. The structure of the gel is eventually compressed, with a considerable loss of volume, and a significant loss of porosity, a xerogel being obtained instead of an aerogel.

However, a process has been disclosed for the preparation of highly porous silica aerogels by the subcritical evaporation of the drying liquid at a pressure close to the atmospheric value. The effect of the surface tension of the liquid is reduced by the careful use of the method and/or by the choice of a suitable drying liquid, as described in U.S. Pat. No. 5,911,658. This method effectively reduces the volume shrinkage during the drying process and gives in most cases an aerogel with a uniform distribution of small pores. Although this method can be used to prepare samples of a small size, i.e. silica aerogel particles, it has never been shown to give monolithic pieces that are free of cracks. In another method, the rate of drying is reduced by heating the wet gel at a subcritical temperature in a chamber with several apertures, so that the liquid to be evaporated can escape slowly (see for example U.S. Pat. No. 3,243,769 and U.S. Pat. No. 5,243,769). Since the chamber is vented to the atmosphere in this way, the pressure in it never exceeds the atmospheric value. This method is generally efficient in the preparation of crack-free monolithic pieces, but it can be very slow, and over a month may be needed to complete the drying process. The drying can be accelerated by increasing the area of the apertures, but the structure of the wet gel then has to be suitably aged, generally for more than a week, in order to prevent the formation of cracks.

Furthermore, International Patent WO 94/25,149 discloses a process for the preparation of silica aerogels under subcritical conditions in which the inside surface of the pores in the wet gel is rendered organic by modifying it with the aid of a silylating agent before drying. This process very effectively eliminates the drying shrinkage and advantageously gives hydrophobic products. However, the most efficient silylating agents are chlorinated compounds, and their use involves undesirable environmental hazards, such as the release of HCl and the formation of various by-products. This calls for a lengthy washing procedure in order to purify the gels, which is both slow and costly. Besides, the products must be particularly resistant to corrosion here, and the associated safety measures call for highly complex and expensive equipment. To eliminate these disadvantages, non-chlorinated silylating agents have been proposed (see for example U.S. Pat. No. 6,159,539). However, these are not as efficient, because their hydrophobic groups are bound to the silica via oxygen bridges, which are easily cleaved by water. Besides, most non-chlorinated silylating agents are unavailable on an industrial scale, which greatly increases the cost of the process. Furthermore, the aerogels modified with organic groups are not very strong mechanically and are easily broken.

All the drying methods described above are aimed at minimizing the capillary pressure without paying enough attention to the microstructure of the gel before the drying operation. However, if the mechanical strength of the wet gel, which depends on its microstructure, is significantly improved, its resistance to volume shrinkage and cracking during the drying process can be expected to improve considerably. A number of solutions have been proposed on this basis. Thus, the use of various catalysts can increase the mean radius of the pores by correspondingly reducing the capillary forces generated during the drying stage. However, this method has not been found to be particularly suitable for the preparation of large monolithic pieces, because no catalyst has been found that permits pores with a mean size greater than 10 nm to be obtained. The introduction of colloidal silica particles into the sol also makes it possible to increase the mean pore radius, but their presence means that the gel loses its homogeneous nature, which restricts the range of compositions that can be used (see for example U.S. Pat. No. 4,681,615). The use of chemical additives, such as for example formaldehyde or dimethylformamide, for controlling the drying process also gives rise to larger pores and a more uniform pore size distribution. This strengthens the matrix of the gel, but the method in question generally produces numerous bubbles in the monolithic pieces. Suitable ageing of the gel before the drying operation is another method for increasing the mean pore diameter of the wet gel, but the usual ageing periods needed make for a long process and increase the cost of equipment (see for example International Patent WO 92/20623 and U.S. Pat. No. 5,023,208). According to U.S. Pat. No. 5,264,197, it is possible to adjust the dimensions of the gel microstructure by varying the relative amounts of the organic solvent and/or the acid catalyst used in the hydrolysis and condensation reactions, so as to obtain the required mechanical and structural properties in the gel before the drying process is begun. However, the synthesis of the wet gel takes several hours, and ageing takes a long time—a week or more—at 70° C. In fact, most of the existing processes aimed at improving the mechanical strength of the wet gel involve prolonged ageing and drying if crack-free monolithic pieces are to be obtained. However, the size of the dry gels obtained here and the overall process time are generally not disclosed.

Whichever method is used, the high porosity of silica aerogels does not only confer unique insulating properties on these products, but it is also responsible for their low mechanical strength, since the stresses can only be propagated here through a feeble solid structure of the silica network, whereas for many applications a high porosity should be accompanied by a high mechanical strength.

To solve the problem of mechanical strength, it has been proposed to use an aerogel in the form of particles absorbed or embedded either in a resin (see for example U.S. Pat. No. 6,143,400) or in a foam (see for example U.S. Pat. Nos. 5,124,364 and No. 6,040,375) as an alternative to using it in the monolithic form. However, organic resins and foams are flammable and reduce the insulating performance of the aerogel.

It has already been suggested to use compacted fibrous materials with an aerogel powder as potential thermal insulators. These materials are made by first preparing the components (i.e. the aerogel powder, fibres and the resins) and then mixing and compacting them to obtain insulating fabrics or plates. However, this preparation is costly, because it calls for large amounts of a supercritical aerogel in powder form and involves a number of critical production steps. Furthermore, the insulating properties of these materials tend to be less good than those of monolithic silica aerogels (see for example U.S. Pat. No. 6,479,416 B1).

It has also been proposed to prepare hybrid aerogels in which the aerogel structure acts as a matrix, and other particles (typically fibres, added to the sol-gel precursor mixture) are incorporated in this matrix to reinforce the silica network. In the process disclosed for example in U.S. Pat. No, 6,087,407, these fibre-reinforced monolithic aerogels also have a very low heat conductance, coupled with an appreciably better mechanical strength than that of pure silica aerogels. However, the production process also includes supercritical drying, which suffers from the technical problems and high cost mentioned before.

In fact, there has not so far been an efficient process for the preparation of large, crack-free monolithic aerogels under subcritical conditions in a reasonable space of time. Nor has there so far been an efficient process for the preparation of these monolithic aerogels with a hydrophobic character and with the necessary mechanical properties for most practical applications.

SUMMARY OF THE INVENTION

According to what has been said above, the present invention aims to provide a new aerogel-type material that is obtained under subcritical conditions in the form of crack-free monolithic pieces resistant to atmospheric humidity and moisture and having both good insulating properties and an improved mechanical strength without having to modify their pore surface chemically.

Another aim of the invention is to provide an aerogel-type material that is a hybrid organic/inorganic nano-scale composite.

A further aim of the invention is to provide a process for the preparation of this aerogel-type material.

An additional aim of the invention is to eliminate the cost associated with the supercritical extraction process.

These and other aims of the invention are achieved by the preparation of an organic colloidal polymer or latex, and by incorporating it in a sol containing an inorganic precursor. After this addition, the resulting mixture is gelled to form a porous solid composite material. This composite material is then aged, washed, and dried subcritically to prevent the collapse of the open network of pores inside the solid. The introduction of the latex particles into the sol before the gel is formed gives a uniform dispersion of the organic phase in the inorganic matrix at the molecular level.

The properties of the composite gel can be adjusted by varying the amount of the organic compound by weight, and widening the range of structures that can be designed on a nano-scale for insulating applications. The physical and chemical properties of the resulting composite materials can be further modified at several points during the sol-gel process by modifying the inorganic matrix, the organic component or the composite aerogel or xerogel material.

More specifically, both the structure and the final properties of the matrix, namely its hydrophobic nature, porosity and mechanical strength, can be closely controlled here by adjusting the concentration of the inorganic precursor in the solution, the amount and type of catalyst, the ratio between water and precursor, and the conditions used for ageing the wet gel. The two-stage synthesis adopted here greatly reduces both the time needed to prepare the wet gel, and the time needed to age it appropriately, and makes it possible to produce wet aerogels with a mean pore diameter greater than 10 nm. The mechanical strength of the product is improved by the use of soft colloidal polymer particles, which modify the impact strength of the product. The latex is designed to form a stable dispersion in the reaction mixture and to copolymerize with the inorganic precursor, thereby creating a truly hybrid material.

Finally, the hybrid material obtained is non-flammable, non-toxic, and biodegradable. Its production cost is lower than that of conventional silica aerogels, because the drying is carried out under the correct subcritical conditions.

Other aims and advantages of the invention will appear from the following detailed description.

BRIEF DESCRIPTION OF THE DRAWING

The drawing illustrates an example of a hybrid organic/inorganic composite aerogel containing silica and particles with butyl methacrylate (BMA) and butyl acrylate (BA).

DETAILED DESCRIPTION OF THE INVENTION

The present invention relates to a process for the preparation of aerogel-type hybrid monolithic materials under subcritical conditions, these products having a hydrophobic nature and high mechanical strength. This process utilizes both a) the versatility of the sol-gel process to adjust the dimensions of the structure and the porosity of the metal oxide network, and b) the synergy between organic and inorganic characteristics to improve on the mechanical behaviour of purely inorganic aerogels while keeping their unique properties that make them excellent insulators.

As described before, the great difficulty of preparing monolithic pieces by the sol-gel method under subcritical conditions is due to the formation of a liquid/gas interface during the drying stage. This interface can generate a very high capillary pressure, which promotes the propagation of cracks and/or the collapse of the pores in the gel if the structure cannot absorb the stresses. In the present invention, this problem is solved in two ways: partly by reducing the capillary pressure during the drying step, and partly by increasing the mechanical strength of the wet gel network before the drying process.

The capillary pressure $P_c$ is defined as follows:

$$P_c = 2\gamma \cdot \cos\theta / r$$

where $\gamma$ is the surface tension of the evaporating liquid, $\theta$ is the angle of contact, and $r$ is the mean radius of the capillary pores. The capillary pressure $P_c$ therefore depends both on the liquid in question and on the network of the wet gel. It can be reduced by reducing the surface tension of the liquid and by increasing the angle of contact and/or the size of the pores.

The sol-gel process basically consists of the synthesis of an amorphous inorganic network by means of some chemical reactions carried out in solution at a low temperature. The most obvious characteristic of this process is that it involves a change from a liquid (a sol or colloidal solution) to a solid (a two-phase or multi-phase gel), which has given rise to the term "sol-gel process". The relevant literature includes for example C. J. Brinker and G. W. Scherer: "Sol-Gel Science and Technology—The Physics and Chemistry of Sol-Gel Processing", published by Academic Press in Boston, Mass. in 1990 (given here as one of the references). Any molecule that can undergo hydrolysis and polycondensation and so form reactive "inorganic" monomers or oligomers can be used as a precursor in the sol-gel process (see for example R. K. Iller: "The Chemistry of Silica", published by Wiley in New York in 1979 (given here as one of the references)). Typical precursors are metal alkoxides with the general formula $M(OR)_n$, which suitably act as a source of "inorganic" monomers, with the advantage of being soluble in the usual organic solvents. In solution, alkoxides are both hydrolysed and condensed to form polymeric species with metal-oxygen-metal bonds [see for example H. J. Schmidt, *Non-Cryst. Solids*, No. 100 (1988), p. 51, given here as a reference]. The functional groups involved here participate in the following three reactions, which are generally used to describe the sol-gel process and which can be written as follows in the case of a silicon alkoxide, $Si(OR)_4$:

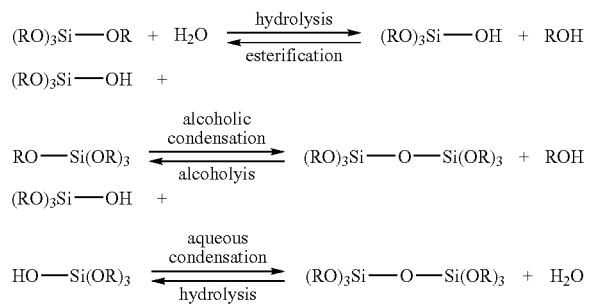

It is clear from these reactions that the structure of sol-gel materials develops in stages: it is the result of a hydrolysis and a condensation reaction, carried out simultaneously or consecutively, as well as the result of the corresponding reverse reactions (esterification and depolymerization, respectively). Thus, it is possible to design the structure and the properties of the wet gel within fairly wide limits by the chemical control of the mechanism and kinetics of the above reactions, namely by varying the temperature, the concentrations of the reagents (the alkoxide and water), the co-solvent for the reagents, the type of alkoxide, and the catalytic conditions of the reaction.

The mild conditions under which these reactions take place make it possible to incorporate organic molecules in the oxide matrix during the preparation of the wet gel. This characteristic of the sol-gel process can be utilized for making high-performance multifunctional hybrid organic/inorganic materials with a structure, morphology and properties that were previously inaccessible to the conventional processes of preparation. Silica-based hybrid materials can be obtained by a) the chemical combination of organic molecules and alkoxide precursors of siloxanes before or during the sol-gel process, or b) by the incorporation of polymeric particles in the solution of the precursor. The presence of a polymer can greatly influence the structure and properties of the final product, mainly by chemically bonding with the inorganic matrix.

After the wet gel has been formed, further processing under subcritical conditions can affect the final structure and properties of the dry gel, whether it is a xerogel or an aerogel. These processing steps include the ageing of the gel (which can modify the mean pore size) and the washing of the aged gel with a suitable liquid (which can help to reduce the surface tension and/or the angle of contact), as well as the regulation of the temperature at which these steps are carried out.

The close control of the final structure and the properties of the dry gel (its hydrophobic nature, porosity and mechanical strength) is achieved in the present invention by optimizing the parameters that influence the synthesis of the wet gel and its ageing. This helps to increase the mean pore radius and so reduce the capillary pressure during the drying operation. The mechanical strength of the wet gel (and of the aerogel) is improved both by the ageing process and by the incorporation of colloidal polymer particles in the solution of the alkoxide precursor. These particles are designed to form a stable dispersion in the reaction mixture and to react with the silica network by undergoing either co-hydrolysis or copolymerization. Finally, the drying of the hybrid gel is conducted under closely controlled subcritical conditions.

Suitable inorganic matrices for the new hybrid material are based on metal oxides produced by the sol-gel process, and silica networks are preferred. Suitable organic polymers include colloidal particles composed of polymers, copolymers or mixtures of polymers with a glass transition temperature close to or below room temperature, provided that they are cross-linked and can form chemical bonds with the silica network.

The individual steps involved in the preparation of the new hybrid inorganic/organic aerogels will be described below in more detail, with special reference to the case of hybrid silica/latex aerogels, to which the process according to the invention applies in particular.

Synthesis of Hybrid Silica/Latex Gels in the Wet State

The first step of the process according to the present invention is the optimized synthesis of hybrid silica/latex gels in the wet state by a two-stage method, with acid/base catalysis of the hydrolysis and condensation reactions of a suitable silicon alkoxide, in an organic solvent, with excess water.

The silicon alkoxide is first hydrolysed by excess water in a strongly acidic medium having a pH at which the condensation reaction is very slow, the reaction mechanism in question being as follows:

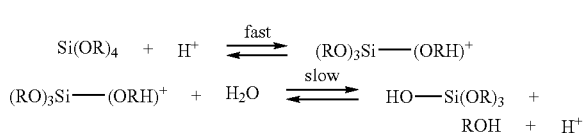

where R is an alkyl group. The acidic sol is then neutralized in order to promote the condensation reaction, which takes place under alkaline catalysis (by OH⁻ ions) according to the following mechanism:

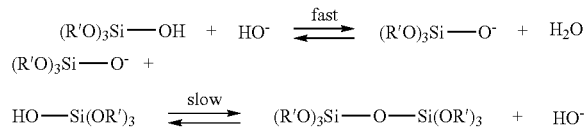

where R' is either a trialkoxysilyl group, i.e. Si(OR)₃, or a hydrogen atom.

In actual fact, these reactions never give pure oxides, and the overall reaction of hydrolytic polycondensation can be written as follows:

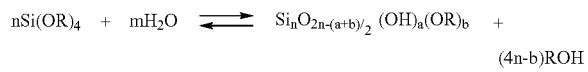

where m is equal to 2n+(a−b)/2 and has a value of 2 when the conversion into silica (SiO₂) is complete. The gel thus obtained is chemically unstable, because its alkoxyl (OR) groups undergo subsequent hydrolysis under the influence of the remaining water. Therefore, the dry gel (a xerogel or even a supercritically dried aerogel) obtained by removing it from the residual solvent is also unstable, since the remaining hydroxyl (OH) groups can still undergo condensation when exposed to atmospheric humidity. The final result is a "live" material that undergoes structural changes (e.g. becomes denser) even months after its preparation.

In the two-stage process according to the invention, the hydroxyl groups present at the beginning of the condensation reaction are mostly linked to silica, which favours the formation of cross-links in the silica network. In addition, the mechanism of the polymerization under alkaline catalysis is also favourable for the formation of cross-links, since the extent of the faster reaction in the second stage increases with the acidity of the Si—OH groups, and this is greater in the case of aggregates, which already contain more cross-links. The overall result is that the larger polymer molecules grow at the expense of the smaller ones, giving rise to a highly cross-linked gel, essentially consisting of pure silica. This is a modified form of the well-known two-stage process [see for example C. J. Brinker et al., *J. Non-Cryst. Solids*, No. 48 (1982), p. 47, and C. J. Brinker et al., *J. Non-Cryst. Solids*, No. 63 (1984), p. 45, which are given here as references]. This enables us to raise the overall yield of silica formation, owing to the efficient separation of the hydrolysis and condensation from each other. The additional advantage of this process is that it gives a wet gel that is intrinsically more hydrophobic than the wet silica prepared by the conventional sol-gel process, so the undesirable steps of chemical modification for replacing the silanol groups can be omitted.

Suitable silica precursors include short-chain alkoxysilanes and preferably the most common ones, namely tetraethoxysilane (TEOS) and tetramethoxysilane (TMOS), the former of these being preferred in particular. The amount of the precursor in the initial solution can be 10-50 wt-%; it is preferably more than 15 wt-% in order to avoid long gelling times, and preferably below 40 wt-% in order to avoid phase separation taking place between tetraethoxysilane and water. The most suitable amount of precursor is 20-30 wt-%.

The molar ratio R between water and tetraethoxysilane (called the "hydrolytic ratio") can vary from 2 to 10 without phase separation taking place between tetraethoxysilane and water. This ratio is preferably above the stoichiometric value (i.e. 4) needed for the complete conversion of the silicon alkoxide into Si(OH)₄, in order to avoid long gelling times; the most preferred values of R are between 6 and 8.

The organic co-solvent for the water-TEOS system mainly affects the statistical interactions between the reacting species and can be any organic solvent that ensures that the system remains homogeneous. Many different solvents can therefore be used, such as:

non-polar solvents, such as dioxan, benzene, hexane and chloroform;

polar aprotic solvents, such as dimethylsulphoxide, dimethylformamide, acetonitrile and acetone; and polar protonic solvents, such as alcohols and formamide.

In the two-stage process according to the invention, which consists of the acid hydrolysis of the alkoxide precursor, and the subsequent alkaline condensation of silica oligomers, the use of a polar protonic solvent is preferred in order to increase the activity of the acid catalyst. The organic co-solvent can be chosen especially from amongst alcohols and mixtures of alcohols, namely methanol, ethanol, propanol, isopropanol and butanol, the last three being preferred in particular.

The latex, which is a dispersion of colloidal particles of a polymer, acts as a modifier of the impact strength by absorbing stresses generated in the network. For this purpose, the latex should have a low glass transition temperature ($T_g$), namely one that is preferably close to room temperature or is below it. To be able to bond chemically with the silica network, the latex should possess specific groups on the surface of its particles (preferably trialkoxysilyl, i.e. Si(OR)₃ groups) that can react with the silica network. The reaction between the latex particles and the silica network that is being formed can take place either during the acid hydrolysis or during the alkaline polycondensation. In the sol-gel polymerization, the trialkoxysilyl groups of the latex undergo either acid hydrolysis (if added in the first stage) or alkaline hydrolysis (if added in the second stage) and will co-condense with the silica oligomers that are being formed, with the formation of chemical bonds between these particles and the silica network.

The latex particles, which improve the mechanical strength of the hybrid gel, should have a diameter below the micron range, i.e. preferably less than 1 μm, and especially in the range of 30-300 nm.

The latex particles should form a stable dispersion and should not aggregate during the synthesis of the hybrid wet gel consisting of silica and latex by the above two-stage process. These particles should be able to resist both the very low and the very high pH values of the reaction mixture and should not aggregate in the presence of the alkyl chains of the alkoxysilanes or in the presence of the alcohol co-solvent. To ensure the necessary stability, the latex particles are cross-linked with the aid of a diacrylate or dimethacrylate co-monomer. Dimethacrylates are the preferred cross-linking agents, and ethylene glycol dimethacrylate is preferred in particular. The cross-linking agent is preferably used in an amount of 0.1-5 wt-%, and more especially in an amount of about 0.5 wt-%, calculated on the whole reaction mixture.

The amount of latex in relation to the final silica matrix can be 0.1-50 wt-% with a view to inducing various mechanical responses in the inorganic network. It is detrimental if the amount of the inorganic moiety is significantly less than 50%, because compositions of this type do not have a sufficient mechanical cohesion. The preferred amount of latex particles is 3-5 wt-%.

When the initial mixture has been prepared from water, tetraethoxysilane, a co-solvent and latex (if the latter is incorporated in the first stage), the hydrolysis is initiated by the addition of an acid, for which purpose any strong acid can be used, but hydrochloric acid (HCl) is preferred. The pH can be adjusted to any value below the isoelectric point of silica (which is about pH 2.7) in order to ensure that condensation is suppressed effectively, so only acid hydrolysis takes place. At such pH values, the hydrolysis proceeds by a two-stage electrophilic mechanism via an activated complex with a positive charge. The rate of reaction is controlled by the concentration of $H_3O^+$ ions in the solution and so the lower the pH, the greater the rate of reaction. The preferred pH value is between 1 and 2.5.

The acidic solution is then placed in a sealed vessel, which acts as a mould for the gel, and is heated and stirred to promote the hydrolysis of the silica precursor. The hydrolytic stage can be carried out at a temperature between room temperature and a value close to the boiling point of the solvent. The temperature should preferably be fixed at 30-80° C. in view of the preferred co-solvents used in the present process. The range of 50-60° C. is preferred particularly in order to prevent the degradation of the latex if it is added in the first stage. This stage typically takes 1 hour, although a shorter time is sufficient in some cases.

The alkaline catalyst is then added to promote gelling, which is brought about by the condensation of the hydrolysed mixture. Any base can be used here as a catalyst, but ammonia ($NH_4OH$) is preferred. Since condensation is the fastest in a neutral medium, the preferred pH for this stage of the process is in the range of 5-8 and preferably 6-7; in such a medium there is a fairly high concentration of protonated and deprotonated silanols. If the pH is below 6, gelling is too slow, taking a few hours, while if the pH is above 7, the gelling is too fast (taking only seconds), which promotes the formation of bubbles inside the gel.

If we optimize the amount of tetraethoxysilane, the hydrolytic ratio, the latex concentration, and the amount of acid and base in each stage, the process according to the invention gives hybrid silica/latex alcogels with a controlled particle size, pore morphology, porosity and pore size in about 1 hour.

Ageing the Wet Hybrid Gels

In the process according to the invention, the freshly prepared alcogels are aged to strengthen the silica network. This improves the mechanical properties of the product and so helps to prevent the formation of cracks during the drying of the gel. This post-synthetic stage involves various processes, such as condensation reactions and the dissolution and re-precipitation of silica. The structure of the aged wet gel is determined by the ageing conditions, such as its medium, temperature and duration.

Various ageing media can be used, including the remaining sol, a water/solvent mixture and a mixture of tetraethoxysilane, water and a solvent, with different compositions. The presence of water is preferred, because it promotes the dissolution and re-precipitation of silica. The presence of tetra-ethoxy-silane is also preferred, because it improves the toughness and mechanical strength of the gel, owing to the hydrolysis and condensation of the added monomers, which are followed by precipitation in the network of the gel. The joint use of water and tetraethoxysilane is especially preferred, because water promotes this second process by making tetraethoxysilane more reactive.

The wet gel is kept in contact with the ageing medium at a temperature that leaves the hybrid material intact because it does not degrade the latex. This can be the same as room temperature or it may be above it, and is preferably in the same range as that used for the preparation of the gel, especially 50-60° C. The gel is kept in the ageing medium inside a sealed vessel for a sufficiently long time to strengthen the network, e.g. for 2-15 days, depending on the size of the monolithic piece required. Long ageing times give larger pores (they increase the pore radius r), and so reduce the capillary pressure during the drying operation (they reduce the value of $P_c$), so a lower density is obtained. Excessively long ageing is undesirable, because it reduces the porosity of the gel, owing to excessive re-precipitation. Speeding up the ageing process by adding ammonia is also undesirable, because it may cause silica to precipitate out on the surface of the alcogel or even form a different gel altogether.

Washing the Hybrid Gels after Ageing

The washing of the wet gel after ageing is very important, since the solvent used for washing will be the liquid that evaporates during the drying operation. If the wet gel is left in the residual ageing solution (which may contain water, unreacted tetraethoxysilane, the catalyst and various organic solvents), concentration gradients will form for the most volatile components during drying. As a result, the transport will be based on diffusion instead of on flow. In such a case, the mutual diffusion of the components of the mixture with very different diffusion coefficients through the wet gel having a low permeability will set up great internal stresses in the network, leading to cracking. Therefore, in the present invention, the possibility of preparing monolithic xerogels is improved by replacing the ageing medium by a suitable drying liquid, this being known as the substitution process.

Preferably an alcohol is used as the washing liquid or solvent in order to make the removal of water from the silica network more effective. Any monohydric, dihydric or trihydric aliphatic alcohol can be used, but those with 1-5 carbon atoms are preferred. Isopropanol is preferred in particular, probably because it forms a larger angle of contact (θ) with the silica network, which helps to reduce the capillary pressure during the drying operation.

The product can be washed in the temperature range used for ageing. The temperature should be low enough to avoid damageing the wet hybrid gel, but high enough to increase the coefficient of diffusion of the liquid, which speeds up the substitution process. The product is preferably washed at 50-60° C. The time needed to remove the residues varies from a few hours to several days, depending on the required size of the monolithic pieces.

Subcritical Drying of the Hybrid Gels

To obtain a dry monolithic gel (whether xerogel or aerogel), the solvent must be removed from the alcogel. It is essential to conduct the drying under controlled conditions, because too fast a drying can make the gel collapse. The rate of drying can be regulated by carrying out the process in an atmosphere that contains the same components as those present in the liquid that surrounds the silica skeleton. This is preferably done in a chamber in which the atmosphere is almost fully saturated with the vapours of this mixture. The suitable drying temperature range extends from room temperature to the boiling point of the liquid to be evaporated, and is preferably between 50 and 60° C.

Synthesis of the Latex

The latex, i.e. the dispersion of colloidal polymer particles, is prepared before the hybrid network is synthesized, because the latex particles can then be incorporated in the porous silica structure during the preparation of the latter, the aim being to use these particles as modifiers of the impact strength of the product.

The latex must be stable, either in water (both at an extremely low pH and at a very high pH) or in organic solvents (to prevent the absorption of the co-solvent and the silica precursor by the latex particles). In other words, the latex must be able to withstand the conditions used in the synthesis of the hybrid gel.

The latex particles are synthesized from a mixture of monomers that give rise to polymers or copolymers with a glass transition temperature ($T_g$) either close to or below room temperature, using a co-monomer that can form cross-links and act as a cross-linking agent. It is best to use a mixture of a monomeric acrylate and methacrylate, with a diacrylate or a dimethacrylate as the cross-linking agent. This agent is preferably a dimethacrylate, and especially ethylene glycol dimethacrylate. The latex particles should have a core-and-crown structure, in which the crown contains groups that can react with the silica network. These groups are introduced with the aid of a co-monomer that contains alkoxysilane groups and preferably trialkoxysilane groups [—$Si(OR)_3$]. The co-monomer is preferably an acrylate or a methacrylate, and is especially trimethoxysilyl methacrylate.

The colloidal polymer particles are prepared by a two-stage emulsion polymerization, using an emulsifier, which is preferably of the anionic type and is especially sodium dodecylsulphate (SDS). The cross-linked nucleating particles, which have a diameter of about 50 nm, are prepared for the core in the first stage by batchwise emulsion polymerization at 70-90° C. and preferably at 80° C. In the second stage, these nucleating or core particles are converted into cross-linked latex particles with a diameter of about 100 nm by emulsion polymerization at about 80° C., preferably by semi-continuous emulsion polymerization, especially with the controlled introduction of the material in order to ensure an effective regulation of the size and composition of the particles.

The preparation of the cross-linked core particles by batchwise emulsion polymerization is carried out in a reactor fitted with a condenser and a mechanical stirrer. It should be mentioned here that the amounts of the components of the reaction mixture in both stages are given below in weight-%, calculated on the whole amount of reagents in each mixture. The following substances are introduced into the reactor:

80-95% of water;
4-5% of butyl methacrylate (BMA);
0.4-0.5% of butyl acrylate (BA);
0.1-1.5% of ethylene glycol dimethacrylate (EGDMA);
0.1-2% of sodium dodecylsulphate (SDS); and
0.1-1% of potassium persulphate (PPS).

In the preferred variant, nitrogen gas is passed through the reaction mixture for 2 hours, and the reactor is then heated to 70-90° C. and preferably to 80° C. for a further 2 hours. This process gives a stable aqueous dispersion of polymer particles with a diameter of 30-60 nm and a small size scatter.

In the second stage of the polymerization, the reactor is charged with the previously prepared dispersion of nucleating or core particles, which forms 40-60% of the reaction mixture in this stage. Nitrogen gas is passed through the material for 15 minutes, and the reactor is heated to 70-90° C. and preferably to 80° C. under a nitrogen atmosphere. Two phases are then introduced into the reactor (an organic and an aqueous phase) at a constant rate over a long period of time, preferably over about 12 hours. The organic phase contains:

15-20% of butyl methacrylate (BMA);
1-2% of butyl acrylate (BA); and
1-2 of ethylene glycol dimethacrylate (EGDMA) cross-linking agent.

The aqueous phase contains:
1-2% of sodium dodecylsulphate (SDS) emulsifier;
0.01-0.1% of potassium persulphate as an Initiator; and
15-20% of water (in which the first two components are dissolved).

The reactor is stirred and kept at 70-90° C. and preferably at 80° C. while the reactants are being introduced, and then for a further 2 hours, after which it is cooled to room temperature. This gives an aqueous dispersion of particles with a diameter of 80-300 nm, a small size scatter, an a solids content of 40 wt-%.

Example

The following example illustrates the process of the present invention for the preparation of a hybrid silica/latex aerogel containing 3 wt-% of latex particles, which consist of a copolymer formed between butyl methacrylate and butyl acrylate, have a mean diameter of 100 nm, and are modified with trimethoxysilyl groups. The physical and mechanical properties of this material were determined by measuring the density, the gas/solid physical adsorption, and the compression strength in one direction. The results were compared with those obtained for a purely inorganic aerogel.

The colloidal polymer particles were prepared by a two-stage emulsion polymerization. The nucleating or core particles were prepared in a reactor fitted with a condenser and a mechanical stirrer. It should be mentioned here that the amounts of the components of the reaction mixture in both stages are given below in weight-%, calculated on the whole amount of reagents in each mixture. The following substances were introduced into the reactor:

94.4% of water;
4.5% of butyl methacrylate (BMA);
0.45% of butyl acrylate (BA);
0.15% of ethylene glycol dimethacrylate (EGDMA);
0.4% of sodium dodecylsulphate (SDS); and
0.1% of potassium persulphate (PPS).

Nitrogen gas was passed through the reaction mixture for 2 hours, and the reactor was then heated to 80° C. for 2 hours.

In the second stage of the polymerization, the reactor was charged with the previously prepared dispersion of nucleating or core particles, which formed 46.5 wt-% of the whole reaction mixture. Nitrogen gas was passed through the material for 15 minutes, and the reactor was heated to 80° C. under a nitrogen atmosphere. An organic phase and an aqueous phase were introduced at a constant rate over 12 hours. The organic phase contained the following compounds:

18% of butyl methacrylate (BMA);
1.8% of butyl acrylate (BA); and
1.2 of ethylene glycol dimethacrylate (EGDMA) cross-linking agent The aqueous phase contained the following compounds:
0.37% of sodium dodecylsulphate (SDS) emulsifier;
0.03% of potassium persulphate as an initiator; and
26.6% of water (in which the first two components were dissolved).

The reactor was stirred and kept at 80° C. for 12 hours while the reactants were being introduced and then for a further 2 hours, after which it was cooled to room temperature. This gave an aqueous dispersion of cross-linked coreand-crown particles that contained trimethoxysilane groups in the crown, had a mean diameter of about 100 nm, and contained 40 wt-% of solids.

A hybrid alcogel was prepared by the two-stage hydrolysis and condensation of tetraethoxysilane (TEOS). The latter was first dissolved in isopropanol (iPrOH), using a TEOS/iPrOH molar ratio of 1:9.2. The aqueous latex dispersion containing about 4 wt-% of solids was diluted with distilled water to obtain a water/TEOS molar ratio of 6.5, after which it was added dropwise to an alcoholic solution of tetraethoxysilane, with stirring. The reaction mixture thus obtained was acidified with 0.1 N hydrochloric acid, using an HCl/TEOS molar ratio of 0.007. The acidic sol containing 25 wt-% of tetraethoxysilane was placed in a closed vessel, heated to 60° C. and stirred for 60 minutes at about 140 rpm. Ammonia was then added until an $NH_4OH$/TEOS molar ratio of 0.007 was obtained. The resulting homogeneous sol was allowed to stand without stirring, whereupon gelling occurred in about 4 minutes. The hybrid alcogel was aged for 48 hours at 60° C., and specifically in the residual liquid over the first 24 hours, and then in the same amount of an ageing liquid comprising tetraethoxysilane, isopropanol and water in the proportions used for preparing the gel. The liquid in the pores was then replaced by washing the product with isopropanol. After washing the gel, it was dried under subcritical conditions at 60° C. and under atmospheric pressure. The evaporation was allowed to continue under controlled conditions until virtually no appreciable weight loss occurred. The dry hybrid gel contained 3 wt-% of latex.

The monolithic aerogel thus obtained was opaque and had the following characteristics:
 porosity: 83% (corresponding to a density of 350 kg/m$^3$);
 specific surface area: 770 m$^2$/g;
 mean pore diameter: 11.5 nm;
 Young's modulus: 44 MPa; and
 mechanical strength: 4.2 MPa.

A purely inorganic aerogel was prepared under the same conditions for the sake of comparison. The same proportions were used again in the preparation of the hybrid aerogel, but the aqueous dispersion of polymer particles was replaced by water. This gave a purely inorganic translucent aerogel with the following characteristics:
 porosity: 82% (corresponding to a density of 370 kg/m$^3$);
 specific surface area: 950 m$^2$/g;
 mean pore diameter: 10 nm;
 Young's modulus: 28 MPa; and
 mechanical strength: 0.9 MPa.

The invention claimed is:

1. A process for the preparation of monolithic silica/latex hybrid xerogels and aerogels under subcritical conditions, comprising the following steps:
 synthesizing a hybrid gel in a mixture, comprising in a first stage acid hydrolysis of a silicon alkoxide with excess water in an organic solvent to prepare a hydrolysed sol, after which in a second stage the hydrolysed sol is subjected to polycondensation under alkaline conditions to prepare a hybrid gel in a wet state;
 pre-prepared colloidal polymer particles, containing alkoxysilane group, in the form of an aqueous dispersion & are incorporated in the above mixture, either in the first stage for co-hydrolysis with the silicon alkoxide, or in the second stage for co-condensation with previously hydrolysed colloidal silica;
 after the polycondensation hybrid gels are aged, washed with a washing solvent, and then dried under subcritical conditions in an atmosphere almost saturated with washing solvent to prepare the hybrid gel in dry state;
the hybrid gel in a dry state has a density of 300-1300 kg/m$^3$, a porosity of 40-85%, a specific surface area of 400-900 m$^2$/g and a mean pore diameter of 2-12 nm.

2. A process according to claim 1, wherein the silicon alkoxide is an alkoxysilane with a short alkyl chain.

3. A process according to claim 2, wherein the amount of silicon alkoxide in the starting solution is 10-50 wt-%.

4. A process according to claim 3, wherein the molar ratio between water and the silicon alkoxide is 2-10.

5. A process according to claim 1, wherein the organic solvent is a polar protonic solvent.

6. A process according to claim 1, wherein the hydrolysis is catalysed by a strong acid.

7. A process according to claim 6, wherein the hydrolysis is carried out at a pH lower than 2.7.

8. A process according to claim 7, wherein the duration of the hydrolysis is limited to 60 minutes.

9. A process according to claim 1, wherein the polycondensation is catalysed by an alkaline catalyst.

10. A process according to claim 9, wherein the polycondensation is carried out at a pH of 5-8.

11. A process according to claim 1, wherein 0.1-50 wt-% of the colloidal polymer particles are incorporated in the hybrid material.

12. A process according to claim 1, wherein the colloidal polymer particles are prepared with a core-and-crown structure and a mean diameter of 30-1000 nm.

13. A process according to claim 12, wherein the colloidal polymer particles consist of a polymer, a copolymer or a mixture of polymers with a glass transition temperature close to or below room temperature.

14. A process according to claim 12, wherein the colloidal polymer particles have cross-linked core and crown.

15. A process according to claim 12, wherein the crown of the colloidal polymer particles is modified with covalently linked alkoxysilane groups.

16. A process according to claim 1, wherein the aqueous dispersion of the colloidal polymer particles is added to the mixture of silicon alkoxide, water and co-solvent before the introduction of the acid catalyst.

17. A process according to claim 1, wherein the aqueous dispersion of the colloidal polymer particles is added to the hydrolysed immediately before, simultaneously with, or immediately after the introduction of a base used as a catalyst.

18. A process according to claim 16, wherein the gels are synthesized at a temperature between room temperature and a value close to the boiling point of the solvent.

19. A process according to claim 1, wherein the gel is aged in a suitable medium, which medium comprises a residual sol following the polycondensation, a mixture of the residual sol, water and a solvent, or a mixture of the residual sol, silicon alkoxide, water and a solvent.

20. A process according to claim 19, wherein the hybrid gel is aged in two stages: first in the residual sol and then in a mixture of the residual sol silicon alkoxide, water and a solvent.

21. A process according to claim 20 wherein the ageing is carried out at a temperature that leaves the hybrid gel intact.

22. A process according to claim 21, wherein after the aging the hybrid gel is washed with a $C_1$-$C_5$ monohydric, dihydric or trihydric aliphatic alcohol.

23. A process according to claim 22 wherein the washing is carried out at a temperature that leaves the hybrid gel intact.

24. A process according to claim 23, wherein the drying of the hybrid gel is carried out under subcritical conditions.

25. A process according to claim 24, wherein the drying is carried out in an atmosphere that is almost fully saturated with the washing solvent and at a temperature that is between room temperature and a value close to the boiling point of the washing solvent.

26. A process for using the hybrid gels prepared according to claim 1, comprising employing the hybrid gels as thermal insulators.

27. A process for using the hybrid gels prepared according to claim 1, comprising employing the hybrid gels as sound insulators.

28. A process for using the hybrid gels prepared according to claim 1, comprising employing the hybrid gels as electrical insulators.

29. A process according to claim 5, wherein the polar protonic solvent is an alcohol or a mixture of alcohols.

30. A process according to claim 13, wherein the colloidal polymer particles comprise an n-butyl methacrylate-n-butyl acrylate copolymer.

31. A process according to claim 2 wherein the alkoxysilane is selected from the group consisting o tetramethoxysilane (TMOS), tetraethoxysilane (TEOS), tetrapropoxysilane (TPOS), and tetrabutoxysilane (TBOS).

* * * * *

UNITED STATES PATENT AND TRADEMARK OFFICE
CERTIFICATE OF CORRECTION

PATENT NO. : 7,737,189 B2
APPLICATION NO. : 11/910716
DATED : June 15, 2010
INVENTOR(S) : Martinho et al.

It is certified that error appears in the above-identified patent and that said Letters Patent is hereby corrected as shown below:

Column 16, line 43, after "hydrolysed", insert --sol--.
Column 16, line 55, after "sol", insert --,--.

Signed and Sealed this

Twenty-seventh Day of July, 2010

David J. Kappos
*Director of the United States Patent and Trademark Office*